Patented Feb. 29, 1944

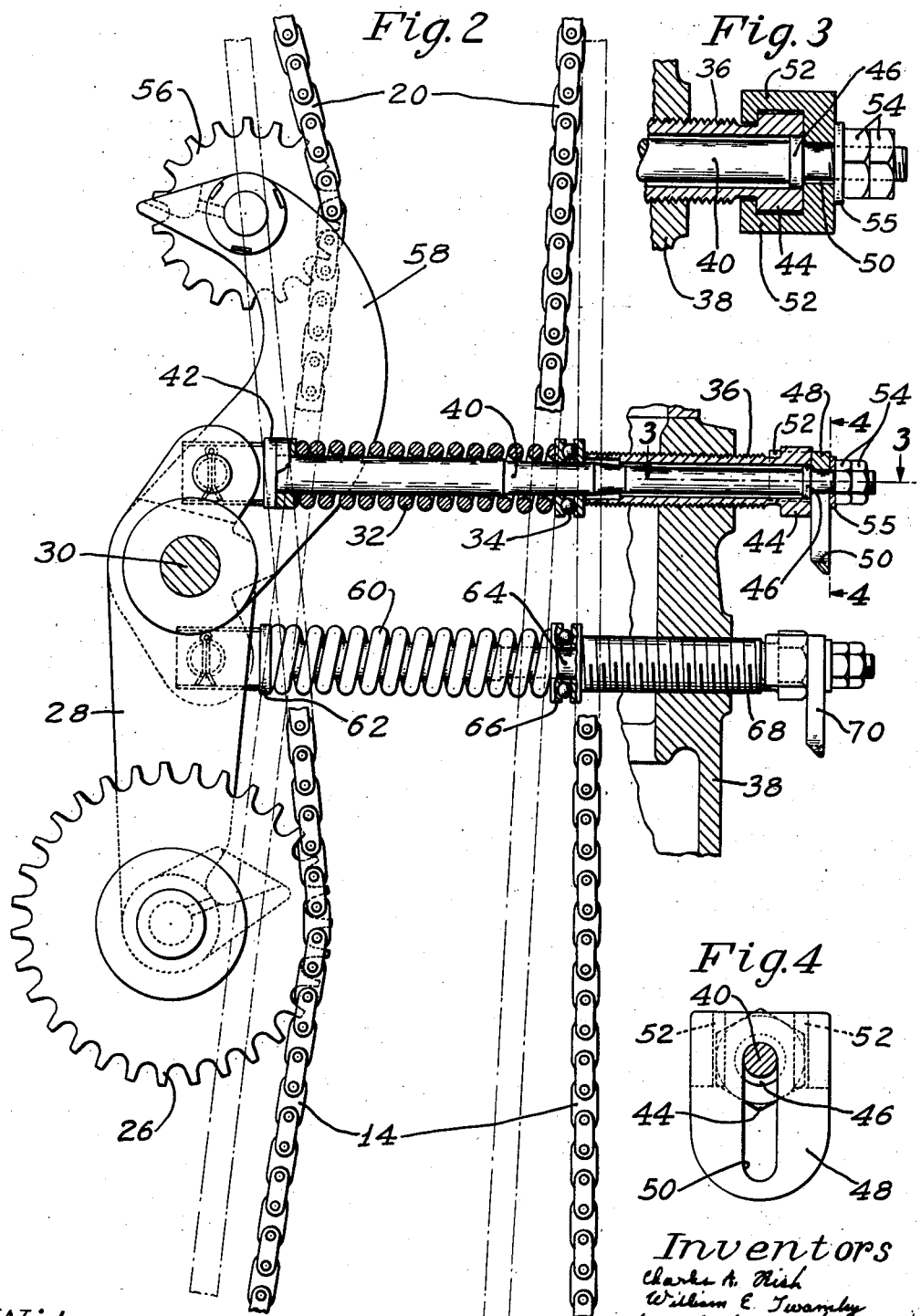

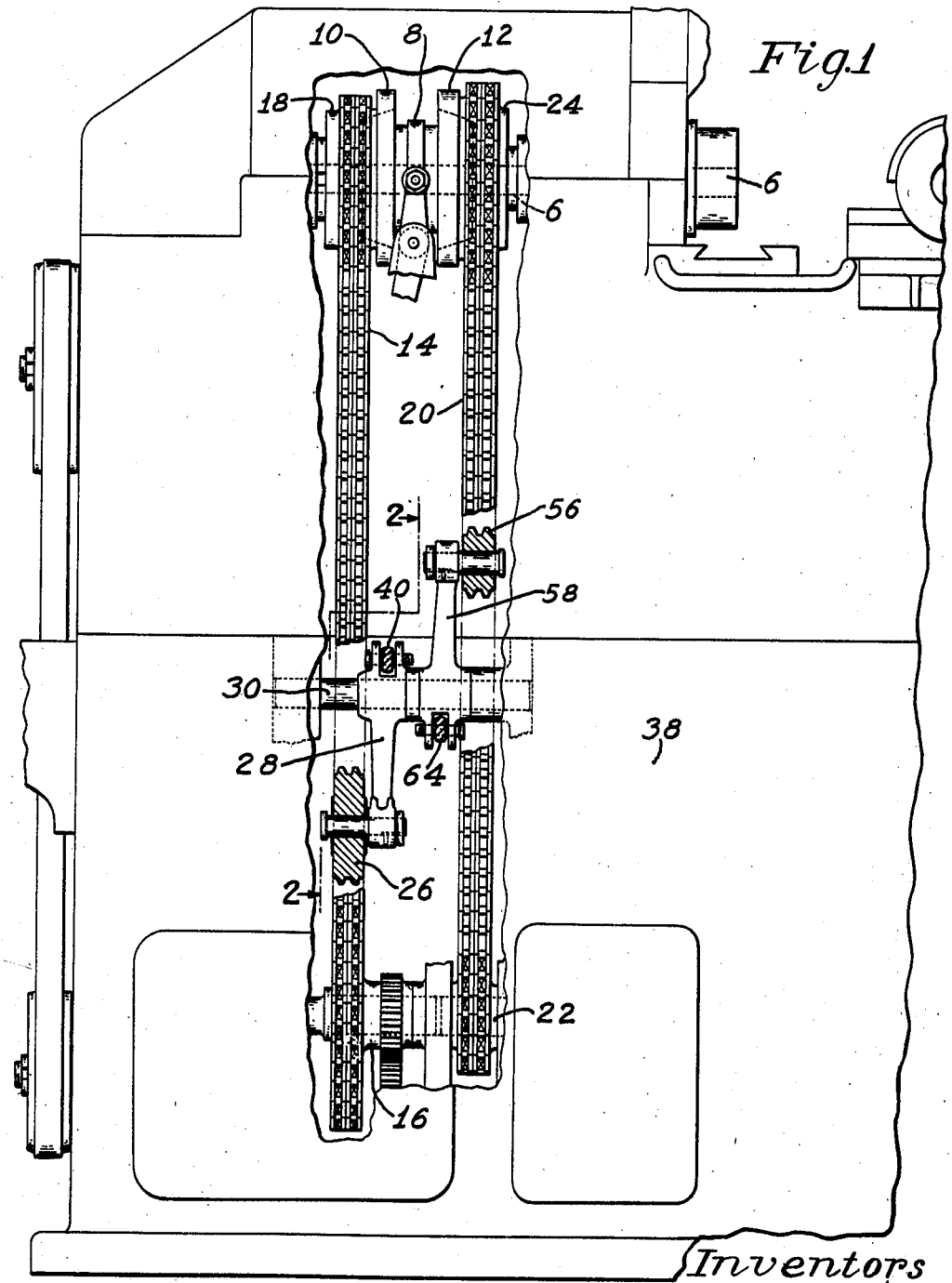

2,343,084

UNITED STATES PATENT OFFICE 2,343,084

TIGHTENING DEVICE FOR SPROCKET
CHAINS, BELTS, AND THE LIKE

Charles A. Rich and William E. Twamley, Providence, R. I., assignors to Brown and Sharpe Manufacturing Company, a corporation of Rhode Island Application July 27, 1940, Serial No. 347,854

12 Claims. (Cl. 74—242.11)

The present invention relates to tightening devices for sprocket chains, belts, bearing elements and the like, and more particularly to a novel and improved positioning device for placing a tightening or take-up element for a rapidly moving machine tool part under a predetermined tension, and for fixedly supporting said element in its position of resilient adjustment.

The invention is herein disclosed in a preferred form as embodied in a tightening device for a sprocket chain forming part of a high speed transmission for the work spindle of an automatic screw machine.

A serious obstacle to the use of a sprocket chain and sprocket type of drive for the work spindle of automatic screw machines, has been the difficulty of maintaining a constant and stable tension on the sprocket chain which will insure efficient operation and reasonable long life for the chain and its driving sprockets under the severe conditions of high speed operation. It has been found that excessive looseness of the sprocket chain results in imperfect and uneven transmission of the drive, and has the effect of causing such a chain to ride outwardly on the sprocket teeth with resulting injury to the mechanism. Any increase of belt tightness beyond the amount absolutely required, is also detrimental, since losses of efficiency and wear in the mechanism tend to increase very rapidly. For any particular sprocket chain installed in a particular machine, and for a given range of operating speeds, it has been found that the amount of tension which should be applied to insure efficient operation and longevity of the sprocket chain drive is determinable within relatively narrow limits, and that any substantial increase or decrease of the chain tightness from the level indicated will seriously affect the efficiency of the drive.

The difficulty of securing and of maintaining an accurate and stable adjustment in the tightness of the sprocket chain, is believed to be due in large part to the tendency of the chain to vibrate or whip under the severe conditions of high speed operation and under the strains imposed in shifting the speed of and in reversing the spindle drive. Resilient or yielding belt tightening devices of ordinary description have been found inadequate to maintain the desired degree of tightness in the chain for the reason that such devices are affected by the whipping action of the chain, and tend to increase rather than to damp out fluctuations in tension so produced.

It is a principal object of the present invention to provide a novel and improved tightening device for sprocket chains, belts and the like, which is well adapted to obtain an accurate and stable adjustment of the tension upon and conquent tightness of particularly a sprocket chain, which will adapt the same for most efficient operation in a high speed transmission.

With this and other objects in view as may hereinafter appear, a feature of the invention consists in the provision of a tightening device for sprocket chains, belts and the like, which embodies therein means for applying an accurately measurable tension against the chain to tighten the same, in combination with means for locking the tensioning device fixedly in its position of yielding adjustment, so that any vibration or whip which may be set up in the sprocket chain under conditions of high speed operation, will be effectively controlled and in large measure damped out, and the desired degree of tightness of the chain will be maintained.

The several features of the invention consist also in the devices, combinations and arrangement of parts hereinafter described and claimed, which together with the advantages to be obtained thereby will be readily understood by one skilled in the art from the following description taken in connection with the accompanying drawings, in which Fig. 1 is a view in front elevation showing a portion of an automatic screw machine with the casing broken away to illustrate particularly a sprocket chain and sprocket drive for the work spindle, and including applicants' improved tightening device; Fig. 2 is an enlarged sectional view taken on the line 2—2 of Fig. 1, illustrating particularly the tightening devices for the two sprocket chains of the work spindle drive; Fig. 3 is a detail plan view taken on the section line 3—3 of Fig. 2, and illustrating particularly the locking device for locking one of the take-up idlers in its adjusted position; and Fig. 4 is a sectional view taken on the line 4—4 of Fig. 2, showing particularly the locking device.

The invention is herein disclosed as embodied in an automatic screw machine which may be of a conventional type including a hollow work spindle 6 which is continuously driven at relatively high speeds. As shown in Fig. 1 of the drawings, the driving connections for the spindle include a clutch generally designated at 8 which meshes with either of two driven clutch members 10 and 12 which are in turn driven through a sprocket chain and sprocket drive from the main driving connections in the base of the machine. As shown in the drawings, the clutch 10 is driven by means of a sprocket chain 14 which passes over a driving sprocket 16 in the base and a driven sprocket 18 associated with the clutch member 10. The clutch member 12 is similarly driven by means of a sprocket chain 20 which passes over a small driving sprocket 22 in the base and over a driven sprocket 24 associated with the clutch member 12.

In accordance with the present invention, tightening devices are provided for the sprocket chains 14 and 20 which are adjustable to produce a tension of predetermined amount on the chains, and which are thereafter maintained fixedly in their adjusted positions to avoid and to damp out variations in tension caused by any vibration or whip which might be set up in the chain during machine operation. Since the tightening devices for the two chains are substantially identical in their construction and mode of operation, the tightening device associated with the sprocket chain 14 only is illustrated and will be described in detail. The tightening device for the sprocket chain 14 comprises an idler sprocket wheel 26 which is supported on a downwardly extending lever arm 28 loosely carried on a laterally extending pivot shaft 30. A short upward extension of the idler supporting lever arm 28 has connected thereto resilient means for tensioning the lever 28 and idler 26 against the sprocket chain 14, and additional means for locking the supporting lever 28 and idler 26 fixedly in their position of yielding adjustment. This mechanism comprises a coiled compression spring 32 seated against a thrust ball bearing 34 which engages against a bushing 36 screw-threaded into a part of the machine frame designated at 38. The spring 32 is coiled about a supporting rod 40 which is pivotally connected at one end to an upward extension of the lever 28, provides support for the thrust bearing 34, and at its other end extends through an axial journal in the bushing 36. A shoulder 42 on the rod 40 provides an end thrust bearing for the spring 32. With this arrangement of the parts, it will readily be seen that axial adjustment of the bushing 36 such as may be achieved through the application of the proper tool to a flange nut 44 formed integrally with the outer end thereof, will tighten or loosen the spring 32, and thereby control the tension exerted on the chain 14.

The strength of the tension applied to the chain will, of course, depend upon the degree of compression to which the spring 32 is subjected. For the assistance of the operator in setting up the spring 32 to provide the required degree of tightness in the chain and sprocket drive, the parts are so arranged that for a proper degree of compression on the spring and tension on the belt, the supporting shaft 40 will occupy a readily recognizable predetermined axial position with relation to the bushing 36. For this properly adjusted position of the parts, a shoulder 46 on the supporting shaft 40 will extend flush with the face of the hexagon portion 44 of the bushing 36.

Further in accordance with the present invention, a locking device is provided which may be readily applied to lock the shaft 40 and bushing 36 rigidly together in the adjusted position thus arrived at, forming a positive connection from the machine frame through the supporting lever 28 and idler 26, and thus fixedly determining the position of the idler 26 in its position of yielding adjustment under the proper tension. The locking device referred to, comprises a clamping member 48 which is slotted at 50 to receive the end of the supporting shaft 40, and is further provided with two side flanges 52 which form between them a T-shaped slot to receive the flange nut 44 on the bushing 36. A pair of check nuts 54 screw-threaded to the end of the supporting shaft 40, together with a washer 55, serve to secure the clamping member 48 to the reduced end portion of the rod 40 against the shoulder 46, thus locking the parts together.

Applicants' device for securing a predetermined adjustment of a spring tension is particularly adapted to insure accurate adjustment by the operator of relatively heavy spring pressures such as employed in the illustrated chain tightening device. As an example the coil spring 32 illustrated in connection with the tightening device for the high speed spindle drive in an automatic screw machine, may be assumed to be formed of $\frac{3}{16}''$ wire, to be approximately 4" in length, and to be compressed to exert a pressure which in the illustrated case should be accurately adjusted to a predetermined value in the order of 350 lbs. It has been found that a precise adjustment of the spring tension is required, particularly for the driving sprocket chain for the high speed spindle drive. A variation of only a comparatively few pounds from the desired pressure can be permitted before excessive wear may be expected to result in the chain and sprocket driving connections. Where, as in the present instance, the amount of the spring pressure is measured in terms of the degree to which it is distorted, that is, the length of the spring under compression, it has been found necessary to adjust the spring under compression to within a fraction of an inch of a predetermined length in order to obtain the desired tension thereon. The method of indicating when a proper adjustment has been reached, by bringing a second plane surface flush with a first provides a simple and efficient way of effecting this adjustment of the spring pressure to the desired value.

The manner of effecting the adjustment of the tension exerted by applicants' chain tightening device, will now be briefly described. Assuming that wear on the chain and sprockets has reduced the actually applied tension, adjustment is effected as follows: The nuts 54 are loosened, and the locking member 48 is pushed upwardly to a limiting position determined by the engagement of the bottom portion of the slot 50 with the reduced portion of the shaft 40, and in which the T-shaped opening clears the hexagonal portion 44 of the bushing 36. If any wear has occurred, the face portion of the shoulder 46 will move inside the sleeve bushing 36, causing the bracket 28 to swing about its pivot shaft 30 in a counterclockwise direction, forcing the sprocket 26 against the chain 14, but with a pressure less than the original setting. To restore the proper amount of pressure, the bushing 36 is threaded further through the casting 38 to compress the spring until the shoulder on the rod and the face of the sleeve are again flush, after which the T-shaped opening in the clamp is drawn down over the hexagonal portion 44 of the sleeve bushing and the nuts 54 are again tightened to hold this setting of the device.

The T-shaped portion of the clamping member 38 is constructed and arranged to fit over the hexagonal portion 44 with a minimum clearance which will permit of its being readily slipped into place, this clearance being in the neighborhood of one thousand or two thousandths of an inch. Thus, if the face of the shouldered portion 46 on the rod 40 should project from the face of the sleeve bushing 36, three thousandths of an inch or more, it will be impossible to draw the locking member 48 down into its locking position. The locking member 48 therefore acts also as a gauge, and prevents the operator from setting an excessive amount of tension on the spring.

The belt tightening device above described provides convenient means for setting up the chain and sprocket mechanism with the required degree of tightness, and is entirely effective to maintain the chain and sprocket mechanism under a substantially even tension during continued operation of the mechanism. Since the parts, including particularly the idler sprocket, are supported in a position of fixed adjustment, it may be expected that the tension exerted on the chain will be gradually eased with continued use and wear of the mechanism. Under these conditions it is a simple matter for the operator to remove the clamping member 48, and again to set up the spring 32 until the shoulder 46 is flush with the rear end of the bushing 36 and nut 44 to permit the re-positioning of the clamping member 48 in locking position.

The sprocket chain 20 is similarly held in a tightened position by means of an idler 56 mounted on a lever arm 58 which is pivotally supported on the pivot shaft 30 above mentioned. A downwardly extending tail of the supporting lever 58 is arranged to be acted upon by a compression spring 60 which is supported at one end against a shoulder 62 on a supporting shaft 64 pivotally connected to the extending tail of the lever 58. At its other end the spring 60 is supported against an end thrust ball bearing 66 engaging the end of a bushing 68 screw-threaded in the machine frame 38. The supporting shaft 64 is arranged to extend through and to be freely adjustable axially of the bushing 68. A locking clamp 70 identical with the clamp 48 previously described, is provided to rigidly secure the supporting shaft 64 to the bushing 68, and thereby to lock the idler 56 and supporting lever 58 in their proper adjusted position.

It will be understood that certain features of the invention relating particularly to the construction and arrangement of applicants' device for positioning a tightening or take-up element, including the combination of the tightening or take-up element, resilient means and the adjusting element arranged so that indication of the position of the tightening or take-up element relative to the adjusting element serves as a measure of the distortion imposed upon and consequent pressure exerted by the resilient element, and also including the above in combination with means for supporting the tightening or take-up element against movement from a predetermined position of adjustment with respect to the adjusting element, are not limited in their application to a chain or belt tightening device, but are of more general application to take-up devices generally for rapidly moving machine tool parts, in which the associated parts are to be maintained in a predetermined position of adjustment.

It will be understood also that the invention is not limited to the specific embodiment shown, and that various deviations may be made therefrom without departing from the spirit and scope of the appended claims.

What is claimed is:

1. In a tightening device for sprocket chains, belts and the like, an idler, an idler supporting lever, a compression type tensioning spring acting upon said lever, a threaded bushing acting as an adjusting element for the spring, a spring supporting rod connected with the lever and passing through the bushing whereby the relative axial position of the rod and bushing will indicate the applied tension of the spring, and a locking device for locking the rod and bushing together to positively hold the idler in its position of resilient adjustment.

2. In a tightening device for a sprocket chain, a tensioning element engaging the chain, a coil type tensioning spring arranged to act on the tensioning element, an axially movable spring supporting rod connected to move with said tensioning element, a fixed support, a sleeve member supported for axial adjustment therein arranged to receive said rod and to provide an adjustable support against which the spring is tensioned, said rod and sleeve member having formed thereon indicating means for indicating their relative axial position and the applied tension of the spring as indicated by said relative position.

3. In a tightening device for a sprocket chain, a tensioning element engaging the chain, a coil type tensioning spring arranged to act on the tensioning alement, an axially movable spring supporting rod connected to move with said tensioning element, a fixed support, a sleeve member supported for axial adjustment therein, arranged to receive said rod and to provide an adjustable support against which the spring is tensioned, and means for positively locking the rod against movement with relation to the sleeve member for a position of resilient adjustment of the tightening device.

4. In a tightening device for a sprocket chain, a tensioning element engaging the chain, a coil type tensioning spring arranged to act on the tensioning element, an axially movable spring supporting rod connected to move with said tensioning element, a fixed support, a sleeve member supported for axial adjustment therein arranged to receive said rod and to provide an adjustable support against which the spring is tensioned, and a device for positively locking the rod to the sleeve member, said rod and sleeve member being constructed and arranged to permit the locking of said device in a predetermined relative position of said rod and sleeve member, and for an adjustment of the sleeve member to exert a predetermined applied tension upon the spring.

5. In a tightening device for a sprocket chain, a tensioning element engaging the chain, a coil type tensioning spring arranged to act on the tensioning element, an axially movable spring supporting rod connected to move with said tensioning element, a fixed support, a sleeve member threaded to the fixed support arranged to receive said rod and to provide an adjustable support against which the spring is tensioned, and a T-shaped locking clamp for locking said rod and sleeve member together, said sleeve member having a flanged outer end for engagement within the T-shaped clamp, and said rod having a shouldered portion against which the clamp is secured.

6. In a tightening device for a sprocket chain, a tensioning element engaging the chain, a coil type tensioning spring arranged to act on the tension element, an axially movable spring supporting rod connected to move with said tensioning element, a fixed support, a sleeve member supported for axial adjustment therein arranged to receive said rod and to provide an adjustable support against which the spring is tensioned, and a locking element applicable for restraining movement of the rod relative to the sleeve member, said rod and sleeve member having surfaces constructed and arranged for a position of resilient adjustment of the tightening device to cooperate with said locking element to positively limit axial movement of the rod relative to the sleeve member.

7. A tightening device for a sprocket chain, belt and the like, which comprises a tightening element, resilient tensioning means therefor, an adjusting element arranged to act on said tensioning means, means on said adjusting element whereby a force can be applied thereto to shift said adjusting element and consequently to adjust the force exerted by said tensioning means, and means for locking said tightening element fixedly in a position initially determined by adjustment of said resilient tensioning means to engage the chain in a non-yielding manner.

8. In a positioning device, the combination of a tightening element, resilient means adapted to exert a tensioning strain on said element, a stationary support, an adjusting element carried thereon acting on said resilient means and movable with relation to said tightening element to vary the distortion of and consequent pressure exerted by said resilient means, and including a screw-threaded connection between the adjusting element and support for effecting said movement of the adjusting element, and means for locking the tightening element in a position relative to said adjusting element to which it has been moved by the operation of said adjusting element to apply said pressure in a non-yielding manner.

9. In a positioning device, the combination of a tightening element, resilient means adapted to exert a tensioning strain on said element, a stationary support, an adjusting element carried thereon acting on said resilient means and movable with relation to the tightening element to vary the distortion of and consequent pressure exerted by said resilient means, an actuating connection between the adjusting element and support whereby force may be applied to the adjusting element for effecting movement of the adjusting element, plane surfaces on the tightening element and adjusting element constructed and arranged to be brought flush with one another through adjustment of the adjusting element to produce a predetermined degree of distortion of the resilient means and corresponding adjustment in position of the tightening element, and means for locking the tightening element in said position of adjustment with respect to the adjusting element.

10. In a positioning device, the combination of a tightening element, resilient means adapted to exert a tensioning strain on said element, a stationary support, an adjusting element carried thereon acting on said resilient means and movable with relation to the tightening element to vary the distortion of and consequent pressure exerted by said resilient means, an actuating connection between the adjusting element and support whereby force may be applied to the adjusting element for effecting said movement thereof, and means for locking the tightening element in a position relative to the adjusting element to which it has been moved by the operation of said adjusting element to apply said pressure in a nonyielding manner, said locking means and elements being constructed and arranged to be rendered operative only for a position of the tightening element relative to the adjusting element in which the distortion of the resilient means does not exceed a predetermined amount.

11. In a positioning device, the combination of a tightening element, resilient means adapted to exert a tensioning strain on said element, a stationary support, an adjusting element carried thereon acting on said resilient means and movable with relation to the tightening element to vary the distortion of and consequent pressure exerted by said resilient means, an actuating connection between the adjusting element and support whereby force may be applied to the adjusting element for effecting said movement thereof, and a locking member movable into locking relation with said elements to lock the tightening element in a position relative to the adjusting element to which it has been moved by the operation of said adjusting element to apply said pressure in a nonyielding manner, said locking means and elements being constructed and arranged to permit the movement of said member into locking position only for a position of the tightening element relative to the adjusting element in which the distortion of the resilient means does not exceed a predetermined amount.

12. In a positioning device, the combination of a tightening element, resilient means adapted to exert a tensioning strain on said element, a stationary support, an adjusting element carried thereon acting on said resilient means and movable with relation to the tightening element to vary the distortion of and consequent pressure exerted by said resilient means, an actuating connection between the adjusting element and support whereby force may be applied to the adjusting element for effecting movement of the adjusting element, cooperating means on the tightening element and on the adjusting element arranged to be brought into a predetermined position with relation to one another through adjustment of the adjusting element to produce a predetermined degree of distortion of the resilient means and a corresponding adjustment in the position of the tightening element, and means for locking said tightening element in said position of adjustment with respect to the adjusting element.

CHARLES A. RICH.
WILLIAM E. TWAMLEY.